Dec. 10, 1940.  V. J. BURNELLI  2,224,641
ALL-WING AIRPLANE
Filed April 7, 1938  2 Sheets-Sheet 2
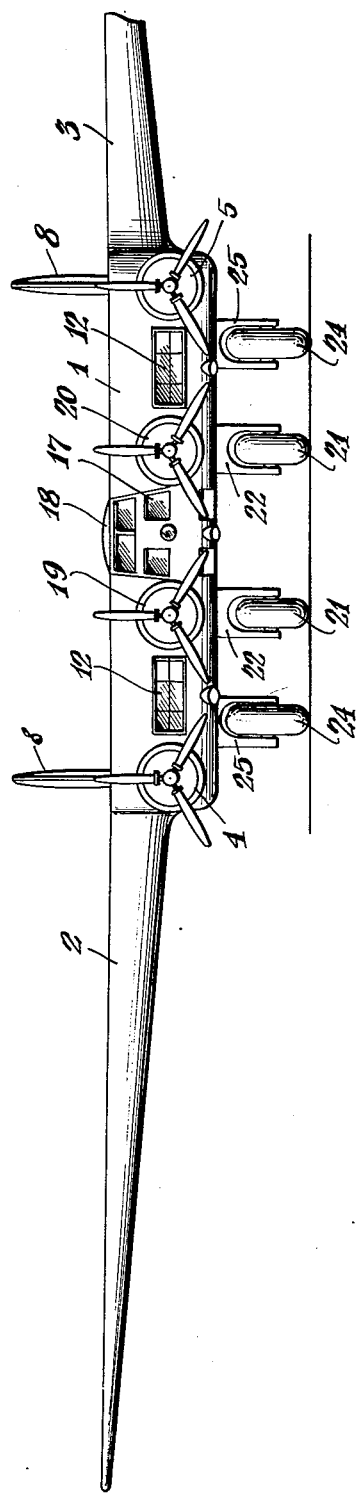
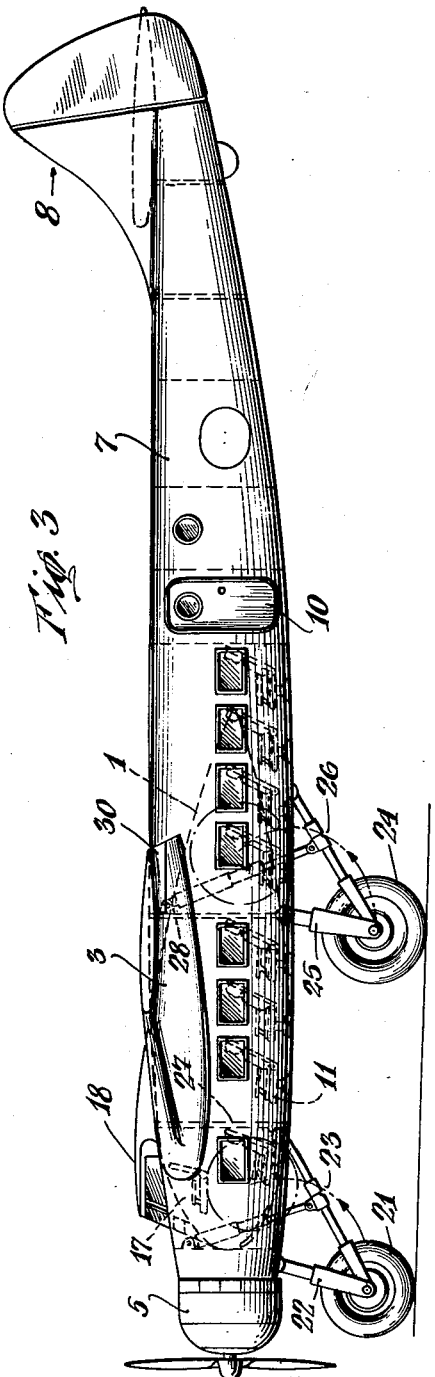
INVENTOR
Vincent J. Burnelli
BY
Frederick W. Barker
ATTORNEY Patented Dec. 10, 1940

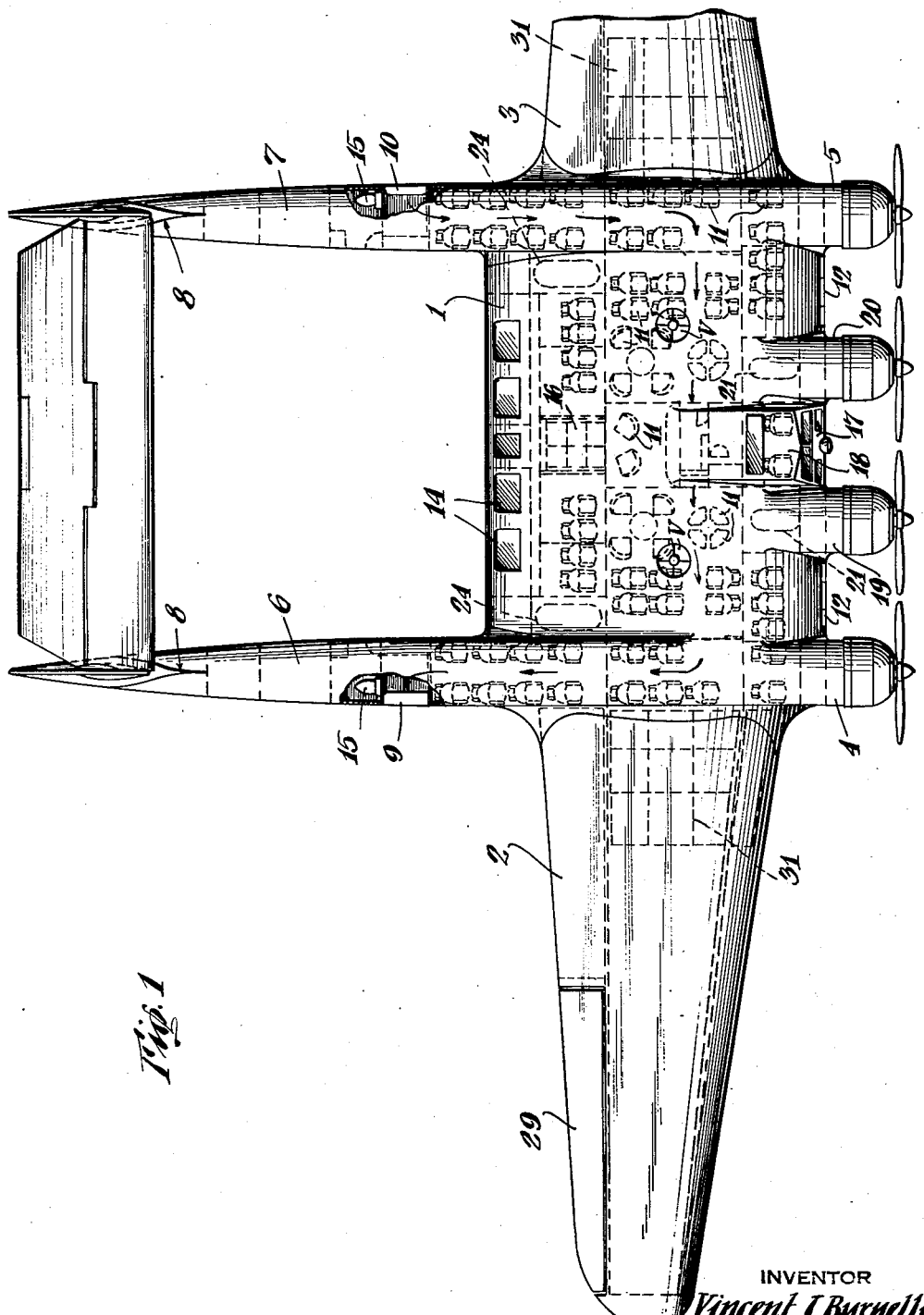

2,224,641

UNITED STATES PATENT OFFICE 2,224,641

ALL-WING AIRPLANE

Vincent J. Burnelli, Keyport, N. J., assignor to Burnelli Aircraft Corporation, a corporation of Delaware Application April 7, 1938, Serial No. 200,591

2 Claims. (Cl. 244—36)

This invention relates to an all-wing airplane of the Burnelli type, having a central wing section of airfoil contour, said airplane being of relatively large size to be capable of transporting many passengers and being powered with a plurality of engines.

In the example of this invention herein illustrated I have shown the airplane as provided with seating accommodation for 74 passengers, but obviously this number may be varied according to the size and capacity of the airplane determined upon.

My present improvement in the main comprehends the provision of hollow booms extending rearwardly from and merging with the sides of the central wing section, serving to support the empennage. Also said hollow booms are of sufficient interior height and width to accommodate seating for a number of passengers, in addition to a passageway enabling communication to and from the interior of the central wing section. Still further, these hollow booms are each provided with a doorway and door, for passenger entry and exit.

In the example here shown four engines with their propellers and housings appear as projecting forwardly from the leading edge of the central wing section and the pilots' cockpit is located rearwardly of the space separating the two central engines, the cockpit hatch being disposed in a horizontal plane above the engines, to permit lateral as well as forward vision for the pilots.

Two forward landing and take-off wheels are shown, each carried by a chassis that is capable of rearward retraction into a well located in the leading edge portion of the central wing section, in advance of the forward spar, and two rearward wheels are shown each carried by a chassis that is capable of retraction into a well located in the trailing edge portion of the central wing section, behind the rear spar.

While the central wing section has sufficient surface area to provide the major part of the lift, lateral wing sections are provided to add to the lift for take-off and landing purposes, and these lateral wing sections have ailerons and flaps. Also the lateral wing sections can carry the fuel.

Other features and advantages of my invention will hereinafter appear.

In the drawings:

Figure 1 is a top plan view of my improved airplane.

Fig. 2 is a front view thereof, and

Fig. 3 is a side view.

In said figures let 1 indicate the central wing section of the airplane and 2, 3 the lateral wing sections.

The outer side portions of the central wing section, in line with the outer engine housings 4, 5 merge into hollow, rearwardly extending booms 6, 7 that carry the empennage 8, and which, though tapering rearwardly, each have approximately the same height for a portion of their length as that of the maximum height of the central section. This height of the booms enables them to serve as passenger passageways, and said booms are provided with doorways and doors 9, 10 for entry and exit.

Passenger seating accommodation is indicated at 11, the seats being here shown arbitrarily as distributed throughout the interior of the central section, and also within the booms. Windows disposed in a plane below the lateral wing sections are provided in the walls of the central wing section and of the booms. The leading edge portion is also provided with windows 12 for forward vision, and skylights 14 are shown in the trailing edge portion. Ventilating means are indicated at V. Toilet facilities 15 also are provided in the booms, and toilet or other facilities are indicated at 16 in the central section.

In the arbitrary showing of seats in the booms two rows thereof appear, with a passageway therebetween for passenger traverse, and arrows in Fig. 1 indicate the clear path which may be followed from, say, the entry 10 in boom 7, through said boom, across the central section, and along boom 6 to an exit 9. The height within the booms and central section is sufficient to permit walking upright.

The pilots' cockpit 17 with hatch 18 is disposed intermediate two inner engine housings 19, 20.

It will be appreciated that while I have illustrated the present embodiment of my improved, large size, all-wing airplane as powered with four engines, the number of engines to be employed is a variable according to the dimensions and load carrying capacity of the craft to be produced.

Two sets of landing gear are shown, the forward set comprising the wheels 21, with olio struts 22 and retraction groups 23, and the rearward set comprising the wheels 24, with olio struts 25 and retraction groups 26.

Retraction is under the control of the pilots, but it should be pointed out that both sets retract rearwardly, the forward set moving into the leading edge portion of the airplane, in advance of the forward spar 27, while the rearward set moves into the trailing edge portion of the airplane, behind the rear spar 28. The wheels 21 and 24 are shown in dot-and-dash lines as retracted in the usual form of wells provided for the purpose.

The lateral wing sections are shown as provided with ailerons 29 and flaps 30; also said sections have fuel tanks 31 fitted therein.

The hatch 18 for cockpit 17 is telescopic, to be capable of vertical adjustment, so that on occasion, by raising the hatch, and the pilot, standing or raising his seat, may have a more complete area of vision, as when about to make a landing.

Variations within the spirit and scope of my invention are equally comprehended by the foregoing disclosure.

I claim:

1. In an all-wing airplane of relatively large size, said airplane having a central wing section of width and area adapted in flight to afford the major lift, engines carried by said central wing section adjacent its leading edge, propellers mounted in front of said leading edge and operated by said engines, a hollow boom at each side of the central section, merging with the top, bottom and sides of said section, said booms increasing the spanwise area of and extending rearwardly from said central section, and lateral wing sections of less mean chord and thickness than the central wing section, extending outwardly from said central section, to assist in take-offs and landings.

2. In an all-wing airplane of relatively large size, said airplane having a central wing section of width and area adapted in flight to afford the major lift, engines carried by said central wing section adjacent its leading edge, propellers mounted in front of said leading edge and operated by said engines, a hollow boom at each side of the central section, merging with the top, bottom and sides of said section, said booms increasing the spanwise area of and extending rearwardly from said central section, said booms having sufficient height for a portion of their rearward length for passenger accommodation, doorways disposed in said booms rearwardly beyond said central section, and lateral wing sections of less mean chord and thickness than the central wing section, extending outwardly from said central section, to assist in take-offs and landings.

VINCENT J. BURNELLI.